Aug. 30, 1966   E. W. HOWARD   3,269,653
VEHICLE HEATING SYSTEM
Filed May 28, 1964   2 Sheets-Sheet 1
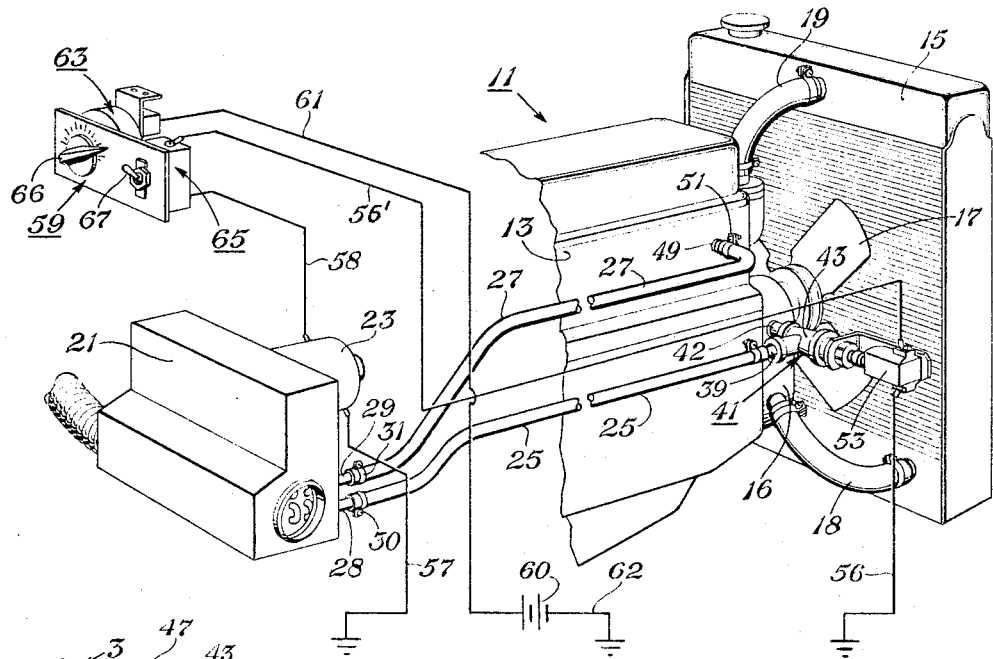
Fig. 1
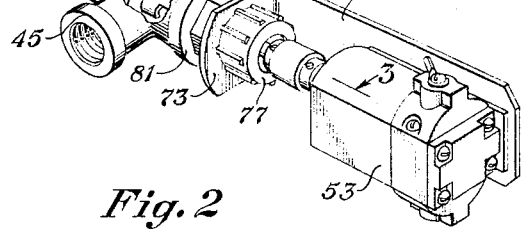
Fig. 2
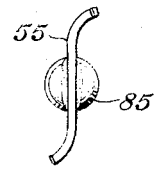
Fig. 5
Fig. 3
INVENTOR
Eishmuel W. Howard
BY
ATTORNEY Aug. 30, 1966　　　E. W. HOWARD　　　3,269,653
VEHICLE HEATING SYSTEM
Filed May 28, 1964　　　2 Sheets-Sheet 2

INVENTOR
Eishmuel W. Howard
BY William D. Harris Jr.
ATTORNEY

United States Patent Office 3,269,653
Patented August 30, 1966

3,269,653
VEHICLE HEATING SYSTEM
Eishmuel W. Howard, 8613 Triton Lane, Dallas, Tex.
Filed May 28, 1964, Ser. No. 371,001
6 Claims. (Cl. 237—12.3)

This invention relates to a process and apparatus for heating the interior of a vehicle when the vehicle's engine is dormant; more specifically it relates to such a process and apparatus that utilizes hot coolant in the dormant engine as a heat source.

On many occasions it is desirable to maintain the interior of a vehicle at a comfortable temperature on a cold day after the vehicle's engine has been shut off to become dormant. Various efforts have been made in the prior art to provide means to accomplish such interior heating of the vehicle when the engine is dormant, but while some of the systems have achieved a certain limited degree of success, in general a practical, simple, yet reliable method or apparatus to achieve such result has not heretofore been available.

It is an object of the present invention to provide a practical, simple, yet reliable method and apparatus for maintaining the interior of a vehicle at a comfortable temperature for a relatively long period after the engine of the vehicle is shut off. Moreover, it is an object to provide such a method and apparatus that may be simply installed on an as-purchased vehicle, utilizing the main heater system, including the heater, in operation.

It is yet an additional object to provide an apparatus of the type referred to in the preceding objects which is durable for a long period.

It is still a further object to provide a method and apparatus achieving the foregoing objects which may be operated for predetermined intervals of time from the vehicle's battery, yet without substantially running the battery down.

The present invention provides a process of maintaining the interior of a vehicle at a comfortable temperature while the engine is dormant but still has hot liquid coolant therein. The type vehicle which the invention finds its use in combination with is one of a liquid-cooled engine, including a radiator, and a heater normally operative on hot liquid coolant circulating from and back to said engine when said engine is operating. The process comprises forcing such hot liquid coolant from the dormant engine through the heater and back to the engine at a flow rate no greater than one-half gallon per minute to substantially prevent flow through the radiator.

The apparatus of the present invention is utilized with a liquid-cooled engine having a block with coolant passages therein and a main coolant pump having a casing with a coolant passage therein in communication with a coolant passage in the block. In such a vehicle heater system, the elements cooperate so that heat is provided for the interior of the vehicle when the engine is operated to drive the main pump. Fluid is forced through the vehicle heater, which has air-blower means, liquid-air transfer surfaces, and a pair of fluid flow lines for circulating hot coolant through the heater from the liquid-cooled engine and returning the coolant to the engine. The apparatus of the present invention comprises an auxiliary system for providing heater operation when the engine is dormant, but while hot coolant remains therein. The auxiliary system includes fluid conduit means having a pair of openings and shaft-receiving means in a wall thereof; means connecting one of the openings in the conduit means to a coolant passage in the engine; the other opening in the conduit means being connected to one of the pairs of fluid flow lines in the vehicle heater system; impeller means disposed in the conduit means for driving fluid therethrough on the rotation thereof; a drive shaft connected to the impeller means and passing through the shaft-receiving means in the fluid conduit means; a motor connected to the drive shaft for rotation thereof; and sealing and bearing means to provide lateral support for the drive shaft while permitting its rotation and maintaining a fluid seal to prevent substantial fluid loss through the shaft-receiving means.

In a preferred embodiment the apparatus described above more specifically includes a motor; impeller means; a rotatable drive shaft having one end connected to the motor carrying the impeller means thereon adjacent its opposite end; a bracket supporting the motor; an annular fitting attached to and supporting the bracket which fitting is disposed concentrically about the drive shaft intermediate the motor and the impeller; a bearing carried in the annular fitting laterally supporting the drive shaft; a flexible annular shaft seal concentrically receiving the shaft, such seal being disposed in the annular fitting between the impeller and the bearing; a T-shaped hollow casing enclosing the impeller, which casing comprises a shaft-receiving arm in sealed engagement with the annular fitting and having a bore which receives passage of the shaft into the casing, such T-shaped hollow casing having a pair of fluid flow arms, each having a passage through it that communicates with the interior of the casing, one of which pair of arms connects to one heater fluid flow line with the passage of such one arm in communication with the one heater fluid flow line; and a rigid conduit which supports and engages the casing by communicative engagement with the other of the pair of arms of the T-shaped casing, such rigid conduit extending from and being supported by the engine with the conduit in fluid communicative engagement with a coolant passage in the engine. By means of such apparatus, in cooperation with the vehicle heater system, hot coolant may be circulated through the heater by the pumping action of the impeller when the motor is operating. Moreover, the motor and bracket are ultimately supported substantially solely from the engine.

A specific aspect of a preferred embodiment of the present invention includes heat insulation means separating the impeller from the drive shaft of the small motor which is used in conjunction with the apparatus of the present invention.

For a more complete understanding of the present invention and for further objects and advantages thereof, reference may now be had to the following description taken in conjunction with the accompanying drawings in which:

FIGURE 1 is a preferred embodiment of the present invention, illustrating such preferred embodiment in operative combination with a conventional engine and heater;

FIGURE 2 is an enlarged perspective view, partially cut away, of the pump utilized in the embodiment of FIGURE 1;

FIGURE 3 is a cross section taken along 3—3 of FIGURE 2;

FIGURE 5 is an end view of the impeller of the pump illustrated in FIGURE 2;

Figure 4:
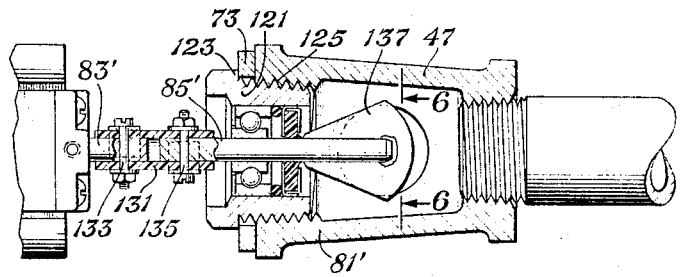
FIGURE 4 illustrates an alternative embodiment of the pump utilized in the instant invention.

Referring to FIGURE 1, an internal combustion engine of the type commonly used in vehicles is schematically indicated generally at reference numeral 11. This engine includes the conventional block 13. Block 13 is equipped with the normal internal cavities and passages to receive and carry a liquid coolant, conventionally referred to as the water jacket. Coolant supply and cooling means are provided by conventional radiator 15. A conventional water pump, the housing 16 of which is visible in FIGURE 1, and fan 17 are provided to cooperate in the customary manner in the function of the cooling system. Hoses 18 and 19 provide fluid coolant communication between the radiator and the coolant system of the engine. The coolant is normally water, or a mixture of water and anti-freeze.

Heater 21 is disposed on the interior of the vehicle. The electrically-powered motor 23 drives a fan or blower to force air through the heater. The heater includes internal liquid-air heat transfer surfaces. A heat transfer liquid, which is the liquid coolant used to cool the motor 11, is circulated to the heater 21 from engine 11 by means of fluid conduit 25 and then back to the engine by fluid conduit 27. These conduits are joined to nipples 28 and 29, which extend from the heater 21, by means of hose clamps 30 and 31.

Conduit 25 connects to and communicates with water pump housing 16 by means of nipple 39, a pump 41 made in accordance with this invention, and a nipple 42. The pump 41 includes a T-shaped housing 43, which may be a conventional T fitting. Nipple 39 is in threaded engagement with internal threads in perpendicular branch or arm 45 of the T-shaped housing 43. Branch or arm 47 of the T has its internally threaded bore engaged with threaded nipple 42 which extends from the water pump housing 16 and communicates with the water passages therein. Arm 47 of housing 43 is one of the straight-through arms thereof.

Conduit 27 connects to the block 13 by means of nipple 49, which communicates with the fluid coolant cavity portions in block 13. The end of conduit 27 which engages the extending end portion of nipple 49 is held in engagement thereon by hose clamp 51.

The pump 41 includes a small electric motor 53, which drives an impeller 55 (later to be described in detail) within the housing 43.

The motor 53 is connected to the vehicle's electrical system by suitable electric wires 56 and 56'. Likewise, the heater fan motor 23 is electrically connected by suitable wires 57 and 58. Wire 57 leads from motor 53 to motor-heater switch assembly 59. Likewise, wire 58 leads from heater fan motor 23 to this same switch assembly 59. The switch assembly 59 is electrically connected to a terminal of the battery 60 of the vehicle through a suitable electric lead 61. The other terminal of battery 60 is connected to ground by lead 62. The switch assembly 59 is provided with a timer switch 63 and a manual switch 65. The details of the hook-up and function of the electrical system will later be described in greater detail.

The general operation of the system of FIGURE 1 will now be described. Operation will normally commence after the engine 11 has been run for a substantial period of time and is then shut off. The coolant fluid will be at or close to its normal operating temperature. Its heat is utilized while the vehicle is not operating by actuation of the switch assembly 59. The switch assembly may be either actuated through the timing switch 63, with its external rotatable time setting dial 66, or by manual toggle 67. On actuation of the switch assembly 59, the heater motor 23 and the pump motor 53 are activated. The impeller 55 of pump 41 forces fluid from the fluid passage in the casing of the water pump 16 via conduit 25 through fluid passages adjacent the heat transfer surfaces provided in heater 21. Thereafter, the fluid flows through conduit 27 and into the coolant cavity of the block 13. It will be appreciated that the liquid outlet from the engine (through nipple 42 in pump casing 16) and the liquid return from the heater into the engine (through nipple 49 in the block) are relatively disposed so that liquid must flow substantially through the entire cooling jacket of the block in the course of circulation. The motor 53 is preferably sized to provide only enough power to maintain a relatively slow circulation. By proper sizing of the pump motor 53, flow is essentially restricted to that fluid in the block. Thus circulation through the comparatively higher fluid resistance path which includes the radiator is prevented. This avoids high heat loss encountered by moving fluid through the heat transfer surfaces of the radiator, which is particularly encountered during early operation after the engine is shut off and prior to normal thermostat operation. The relatively smaller amount of fluid which can be utilized as a heat source by such operation has been found to provide more heat than is obtained when the total fluid, including that available in the radiator, is circulated through a path including the radiator, even though such total circulating occurs only prior to normal thermostat closing, i.e., the closing of the conventional thermostat which cuts off circulation between the radiator and block when coolant temperature is below a certain predetermined value.

The heat in the motor coolant fluid is ultimately transferred to the interior of the vehicle by the air flowing through heater 21. At the desired time, the switch assembly 59 is cut off to stop operation of the heater motor 23 and of the pump motor 53. If the timer switch 63 is used, this cut off is automatic at a predetermined time. If the manual switch 65 is used, the cut off is accomplished by the manual actuation of the operator.

The interior of the vehicle can be maintained at a warm, comfortable temperature for a surprisingly long period of time in accordance with the foregoing operation. As will be pointed out at a later point herein by specific examples, a comfortable temperature within a vehicle can be maintained for as long as one hour when ambient temperature is quite low.

Referring now to FIGURES 2, 3 and 5, the structure of the pump 41 will be described. The motor 53 is supported on a bracket 71. The bracket 71 has a flat base portion, to which the motor 53 is bolted or otherwise joined. A transversely extending end portion 73 of the bracket 71 has a circular opening formed therethrough. The nipple 75 has a threaded end which passes through this opening and is supported by engagement of its threaded end with the mating of threaded collar 77. This collar 77 is tightened sufficiently to bear firmly against transverse bracket end portion 73 of bracket 71 and hold diametrically enlarged shoulder 76 of nipple 75 against the opposite side of bracket end portion 73. The end of nipple 75 most remote from motor 53 is threaded and carries mating internally threaded arm 81 of T-shaped housing 43.

The drive shaft 83 of motor 53 extends outwardly in the direction of the center of the bore of arm 81 of T-shaped housing 43. Shaft 83 is joined to impeller shaft 85 by means of a pair of annular shaft couplings 87 and 89. Shaft coupling 87 is secured on drive shaft 83 by means of set screw 91 and shaft coupling 89 is supported on impeller shaft 85 by means of set screw 93. These couplings are spaced apart and have reduced diametrical end portions aligned and adjacently disposed. These end portions each bear a series of spaced apart ridges such as are illustrated at 95 and 97 on shaft couplings 87 and 89, respectively. A rubber sleeve 99 having ridges and grooves formed on its inner surfaces adapted to engage and mate with the ridged ends of couplings 87 and 89 rides over these ends and joins the couplings together. It will be apparent that considerable flexibility is given the shaft-to-shaft joint resulting from the junction accomplished by this rubber sleeve 99. Moreover, the separation of the drive shaft 83 and impeller shaft 85 by means of rubber sleeve 99 provides a thermal conduction insulator which drastically cuts down the transfer of heat from shaft 85 to shaft 83. A roller bearing 101 is tightly press fitted within the bore of the nipple 75. Its inner race lies about impeller shaft 85 and its outer race engages inner surfaces of the bore of nipple 75. A flexible O-ring 103 disposed within the bore of nipple 75 lies against the side of the bearing 101 remote from the motor 53 and separates the bearing from shaft seal 105. Shaft seal 105 includes an annular neoprene seal member 107 which is enclosed between a pair of oppositely disposed, telescopically engaged metal closure cups 108 and 109. These cups each have a central aperture which permits the shaft 85 to pass therethrough and ride in close engagement with the annular neoprene seal member 107. The impeller shaft 85 extends into T-shaped housing 43 by way of housing arm 81. Impeller 55 is fixed to the free end of impeller shaft 85, as by welding. The impeller shape utilized in the form of the invention illustrated in FIGURES 2, 3 and 5 has reversed curved ends, which, when viewed in cross section (see FIGURE 5) give the general appearance of an S shape. The impeller is disposed to lie centrally within T-shaped housing 43 so that its body is in alignment with the bore of the arm 45. So located, it is positioned to drive fluid therethrough.

A somewhat modified embodiment of this invention is illustrated in FIGURE 4. Therein, the nipple running through the opening in the transverse bracket end 73 is replaced by a bushing 121. The shoulder 123 of bushing 121 is held firmly against the side of transverse bracket end 73 nearest the motor 53 by the threaded engagement of the arm 81 of T-shaped housing 43 with the threaded portion 125 of bushing 121.

Figure 6:
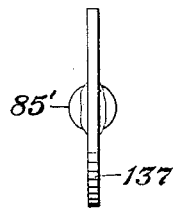
FIGURE 6 is an end view of the impeller of the pump of FIGURE 4.

A somewhat different type of shaft coupling is provided in the embodiment illustrated in FIGURES 4 and 6. Therein, the plastic sleeve 131 connects the aligned but spaced apart shafts 83' and 85'. The plastic sleeve 131 is joined to shaft 83' by bolt 133 and to shaft 85' by bolt 135, both bolts being provided with suitable nuts. The plastic sleeve 131 provides not only convenient connection means between the motor shaft and the impeller shaft, but in addition provides an insulation barrier which cuts down the conductive transfer of heat between the shafts quite substantially. Thus, very little heat is lost by transfer from the shafts to the exterior of T-shaped housing 43. Moreover, it is pointed out that the electric motor 53 is thus insulated from transfer of heat to its interior from the hot liquid flowing through T-shaped housing 43.

The embodiment of FIGURE 4 is provided with a flat impeller 137 (see FIGURE 6 for end view). This impeller has the advantage of being operable in either direction. Thus, the electrical leads to the motor may be reversed at will and the pump will still function satisfactorily.

Figure 8:
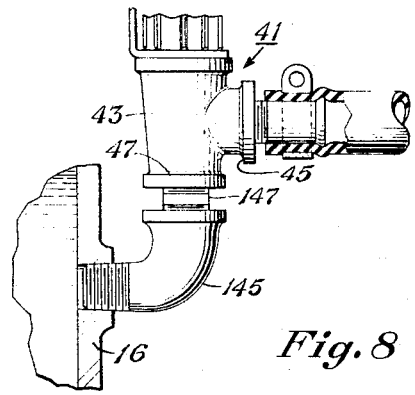
FIGURE 8 illustrates an alternative method of connecting the pump of the instant invention to the main water pump casing.
Figure 7:
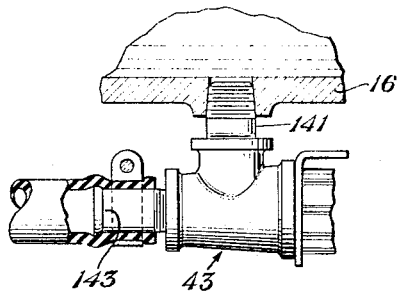
FIGURE 7 illustrates one means of connecting the pump of the instant invention to the main water pump casing of the engine.

FIGURES 7 and 8 illustrate two different methods for mounting the pump to the block of the motor. Referring to FIGURE 7, note that the connection of the main pump housing 16 to T-shaped housing 43 is simply made by means of threaded nipple 141. Conventionally, stock vehicles are sold with a one-half inch bore in the water pump casing which receives a threaded one-half inch nipple to make provision for heater conduit connections. The nipples provided are smooth on the extending end portion and include an outermost lip so that a heater hose may be inserted over such a nipple end and clamped thereon. It is preferred that an arm of the T-shaped housing 43 be one-half inch as a matter of convenience and it is also preferred that another arm of the T-shaped housing be one-half inch. Such sizing permits the "original equipment" nipple to be removed from the block and replaced by a connecting one-half inch nipple; the "original equipment" nipple is then screwed into the arm of the T-shaped housing closest the heater (e.g., arm 45 in FIGURE 8). The heater conduit is then inserted over the smooth extending end of the "original equipment" nipple (designated by numeral 143 in FIGURE 3) and clamped in place by a conventional hose clamp. The arm 81 of T-shaped housing 43 to which the motor for the auxiliary heater system is joined is preferably sized to receive a three-quarter inch fitting. Thus, it is seen that the preferred sizing permits use of a standard T fitting that is three-quarter inch by one-half inch by one-half inch for the T-shaped housing utilized in this invention.

In FIGURE 8, a vertical mounting is illustrated for the pump 41. This mounting is effected simply by the insertion of the externally threaded end of street L 145 into the threaded bore of the main water pump casing 16. A short nipple 147 is used to join the threaded female end of the of the street L 145 to arm 47 of the T-shaped housing 43.

In both the case of the horizontal-type mounting of FIGURE 7, and the vertical mounting of FIGURE 8, it will be appreciated that the pump 41 is entirely supported by the engine 11. This is most advantageous since essentially all relative vibrations are eliminated which would be encountered in the course of vehicle motion if the pump were mounted to the body or another part of the vehicle's chassis.

Figure 9:
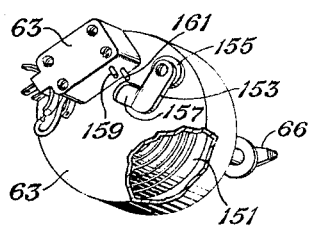
FIGURE 9 is a partial cut away perspective view of the timer illustrated in the embodiment of FIGURE 1.

The electrical wiring system, including the switches, previously discussed generally in connection with FIGURE 1 will now be described in detail. The timing switch 63, with its rotatable knob 66 carries a flat coiled spring 151 within its casing (see FIGURE 9). This spring is tightened when the knob is set and it serves to power the conventional timing mechanism by its unwinding. Rocker arm 153 is connected to a pivot 155 which is actuated by the conventional timing mechanism. At time 0, i.e., when the predetermined time period set has expired and the spring has accordingly unwound, the striker 157 on the end of arm 153 makes contact with the two microswitch buttons 159 and 161 and depresses them.

Figure 10:
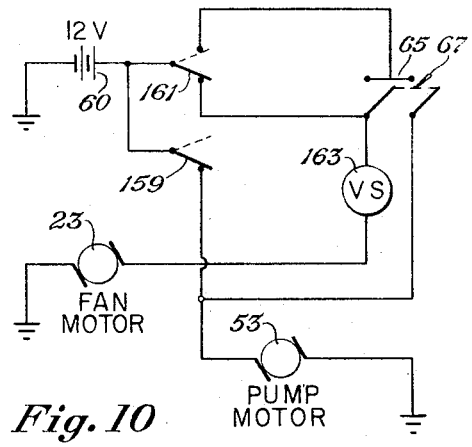
FIGURE 10 is a circuit diagram illustrating the electrical circuit of the embodiment of FIGURE 1.

Referring now to the circuit diagram of FIGURE 10, the battery 60 has one terminal grounded. The other terminal is wired to microswitches 159 and 161 by parallel paths. Microswitch 161 has one contact wired to the heater fan motor 23. Another contact of microswitch 161 is wired to switch 65. One path from switch 65 leads to pump motor 53. A second path is provided from the battery to pump motor 53 by microswitch 159 when it is in the closed position. As illustrated in FIGURE 10, when the timing switch 63 is operating with the rocker arm 153 retracted, it will be seen that an electrical path is provided from the battery 60 via microswitch 161 to the fan motor, and that a second path is provided via switch 159 to the pump motor. Thus, while the timing mechanism is operating, the fan motor and pump motor are provided with power. At the end of the timing cycle, the rocker arm 153 moves and its striker 157 depresses the buttons of microswitches 159 and 161. This moves the microswitches to the alternate position illustrated in FIGURE 10, thus breaking the circuit to the fan motor and to the pump motor. If desired, the manual switch 65 can be used instead of the timer switch 63. With the timer switch 63 out of timing operation, the switch blades of microswitches 159 and 161 will be in the alternate position illustrated by the dotted lines in FIGURE 10. Thus, on the closing of the toggle 67 of switch 65 (indicated as open in FIGURE 10), a circuit will be completed via microswitch 161 to closed switch 65 and thence to both the fan motor and pump motor.

It is thus seen that either manual actuation or actuation at a predetermined time is provided by the wiring and switches associated with the fan and pump.

Generally, the heater fan motor 23 will be provided with a speed control means which allows comparatively high, low, and in some instances various intermediate heater speeds. Such a speed control means, sometimes referred to as the "high-low switch," may be included in the circuit of the present invention, as is schematically illustrated by inclusion of variable speed element 163 in the circuit diagram of FIGURE 10.

It may be desired to replace the timing mechanism provided in connection with timing switch 63 by a thermostatically operated switch which has its thermostat element in contact with the fluid flowing through the pump 42. Such a mechanism provides a switch that is in the "off" position, as long as the water temperature is below a certain point, and in the "on" position when it is above that point.

As an example of the operation of this invention, the system illustrated in FIGURE 1 was tested in an automobile when the ambient temperature was 12° F. The initial temperature in the automobile was 22° F. The engine was started and after eight minutes operation of the engine, with the heater on, the temperature in the front of the automobile was 61° F. and in the rear of the automobile 59° F. The blower air, as it emerged from the heater, had the approximate temperature of 160° F. The engine was stopped at this time and the manual switch 65 was actuated to start the heater and the pump motor of this invention. After one hour operation with the ambient temperature outside remaining approximately constant at 12° F., it was found that the temperature had increased 3° in the front and in the rear of the vehicle to temperatures of 64° F. and 62° F., respectively. At that time, the engine was started and run for four minutes and thereafter stopped. The heater fan and pump motor of this invention were activated and the auxiliary heating system was allowed to function for one hour with the engine off. At the end of that period of time, the temperature in the vehicle was approximately 67° F. in the front and 62° F. in the back. Again the motor was started and allowed to run until the heater air had an output temperature of approximately 160° F. This took about five minutes. At the end of this period, the engine was again shut off and the "off-duty" heating system of this invention put into operation. At the end of an hour's operation, without ever starting the motor, the temperature was found to be 61° F. in the rear of the vehicle, and 71° F. in the front.

It should be noted that a small motor is preferably used in connection with the pump employed in the system of this invention. This is important for two reasons. A small motor only pulls a very small amount of current, and, accordingly, does not run down the battery to the point that starting is difficult after relatively sustained periods of the "off-duty" heating system's operation. Moreover, the horsepower delivered by the pump should be relatively low in order that the pumping operation does not cause substantial circulation through the radiator while the conventional thermostat is in the open position. If radiator circulation does occur, the cooling effect in the radiator is so substantial that the sustained periods of operation referred to in the example given above cannot be expected. In the foregoing example, the motor used with the pump was rated at 1/80 of a horsepower. It was operated by the 12 volt battery in the vehicle. Such a motor draws about 0.7 amp current. There is little tendency for this small current to substantially run the battery down. In a system of this size, with a 1/80 horsepower motor for the pump, approximately one gallon of water or comparable coolant liquid is pumped through the heater every two minutes. If the motor is substantially above this size in a comparable system, then the circulation becomes too rapid for best sustained heating of the vehicle and radiator circulation may be expected.

Having described the invention in connection with certain specific embodiments thereof, it is to be understood that further modifications may now suggest themselves to those skilled in the art and it is intended to cover such modifications as fall within the scope of the appended claims.

What is claimed is:

1. The process of maintaining the interior of a vehicle having a liquid-cooled engine, including a radiator connected to other parts of said engine by conduit means for coolant flow between said radiator and said other parts of said engine, and a heater normally operative on hot liquid coolant circulated from said engine to said heater and back to said engine when said engine is operating, at a comforatable temperature while said engine is dormant but still has hot liquid coolant therein comprising forcing said hot liquid coolant from said engine through said heater and back to said engine at a flow rate no greater than one-half gallon per minute to substantially prevent flow through said radiator.

2. In a vehicle heater system wherein a liquid-cooled engine having a block with coolant passages therein and a main coolant pump having a casing with a coolant passage therein in communication with a coolant passage in said block cooperate with a heater to provide heat for the interior of said vehicle when said engine is operating to drive said main pump, said vehicle heater including air-blower means, liquid-air heater transfer surfaces, and a pair of fluid flow lines for circulating hot coolant through said heater from said liquid-cooled engine and returning said coolant thereto, the combination with said system of an auxiliary system for providing heater operation when said engine is dormant, but while hot coolant remains therein, said auxiliary system comprising:
    (a) fluid conduit means having a pair of openings and a shaft-receiving means in a wall thereof;
    (b) a rigid fluid conveying fitting connecting one of said openings in said conduit means to a coolant passage in said engine;
    (c) said other opening in said conduit means being connected to one of said pair of fluid flow lines;
    (d) impeller means disposed in said conduit means for driving fluid therethrough on the rotation thereof;
    (e) a drive shaft connected to said impeller means and passing through said shaft-receiving means in said fluid conduit;
    (f) a motor connected to said drive shaft for rotation thereof; and
    (g) sealing and bearing means to provide lateral support for said drive shaft while permitting its rotation and maintaining a fluid seal to prevent substantial fluid loss through said shaft-receiving means.

3. The combination of claim 2 wherein said motor is supported by bracket means, said bracket means being supported by engagement with said fluid conduit means and said fluid conduit means being supported by said engine by means of said rigid fluid conveying fitting.

4. The combination of claim 2 in which said auxiliary system has a flow capacity for coolant which is no greater than about one-half gallon per minute.

5. The combination of claim 2 in which said motor and said impeller means have heat insulation means interposed therebetween along said shaft.

6. In a vehicle heater system wherein a liquid-cooled engine having a block with coolant passages therein and a main coolant pump having a casing with a coolant passage therein in communication with the coolant passage in said block cooperate with a heater to provide heat for said vehicle when said engine is operating to drive said main pump, said vehicle heater including air-blower means, liquid-air heater transfer surfaces, and a pair of fluid flow lines for circulating hot coolant through said heater from said liquid-cooled engine and returning said coolant thereto, the combination with said vehicle heater and said engine of an auxiliary system for providing heater operation when said engine is dormant, but while hot coolant remains therein, said auxiliary system comprising:
    (a) a motor;

(b) impeller means;

(c) a drive shaft having one end connected to said motor carrying said impeller means thereon adjacent its opposite end, said drive shaft being rotatable by said motor:

(d) a bracket supporting said motor;

(e) an annular fitting attached to and supporting said bracket and disposed concentrically about said drive shaft intermediate said motor and said impeller means;

(f) a bearing carried in said annular fitting laterally supporting said drive shaft;

(g) a flexible annular shaft seal concentrically receiving said shaft, said seal being disposed in said annular fitting between said impeller means and said bearing;

(h) a T-shaped hollow casing enclosing said impeller means, said casing comprising a shaft-receiving arm in sealed engagement with said annular fitting and having a bore therein receiving the passage of said shaft into said casing, said T-shaped hollow casing further comprising a pair of fluid flow arms, each with a passage therethrough communicating with the interior of said casing, one of said pair of arms connecting to one of said heater fluid flow lines with the passage of said one arm in communication therewith; and (i) a rigid conduit supporting and engaging said casing by communicative engagement with the other of said pair of arms of said T-shaped casing, said rigid conduit extending from and being supported by said engine with said conduit in fluid communicative engagement with a coolant passage in said engine;

whereby hot coolant may be circulated through said heater by the pumping action of said impeller means when said motor is operating and said motor and bracket ultimately supported substantially solely from said engine.

References Cited by the Examiner

UNITED STATES PATENTS

| | | | |
|---|---|---|---|
| 2,019,991 | 11/1935 | Nilson | 237—12.3 X |
| 2,055,299 | 9/1936 | Lum | 237—63 X |
| 2,170,032 | 8/1939 | Page | 237—12.3 |
| 2,264,945 | 12/1941 | LeFevre | 237—12.3 |
| 2,475,166 | 7/1949 | Vanerka | 237—32 X |
| 2,801,802 | 8/1957 | Jackson | 237—12.3 X |

EDWARD J. MICHAEL, *Primary Examiner.*